J. W. & I. S. HYATT.
Comb-Cutting Machine.

No. 164,648. Patented June 22, 1875.

Witnesses
Chas H Smith
Geo. T. Pinckney

Inventors,
John W. Hyatt
Isaiah S. Hyatt
per Lemuel W. Serrell
atty.

UNITED STATES PATENT OFFICE.

JOHN W. HYATT AND ISAIAH SMITH HYATT, OF NEWARK, NEW JERSEY.

IMPROVEMENT IN COMB-CUTTING MACHINES.

Specification forming part of Letters Patent No. 164,648, dated June 22, 1875; application filed November 11, 1874.

*To all whom it may concern:*

Be it known that we, JOHN W. HYATT and ISAIAH SMITH HYATT, of Newark, in the county of Essex, and State of New Jersey, have invented an Improvement in Comb-Cutting Machines, of which the following is a specification:

Combs have heretofore been pressed out of a flat sheet of horn or other material with dies, and in some cases the teeth have been formed by saws or cutters, acting either separately or in gangs, and the teeth have afterward been rounded at their edges by a scraping-tool.

Our invention is made for engraving a comb-blank with ranges of furrows by a gang of tools, so as to cut about half through the blank and then reversing such blank and engraving similar furrows upon the other side until the furrows unite and the teeth remain separate and distinct and finished throughout the entire surface.

Figure 2:
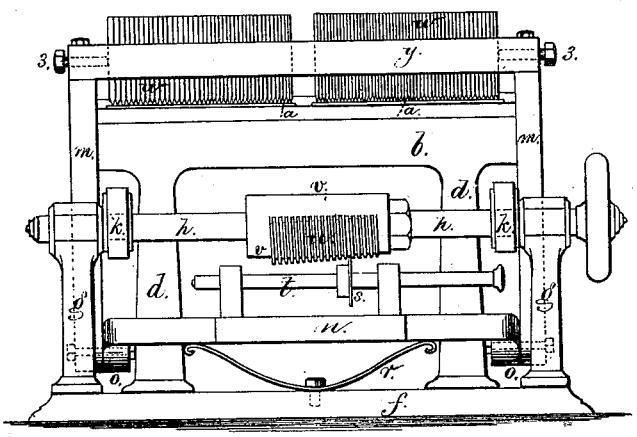
Figure 3:
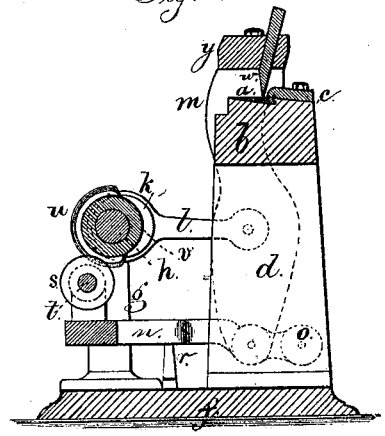
Figure 1:
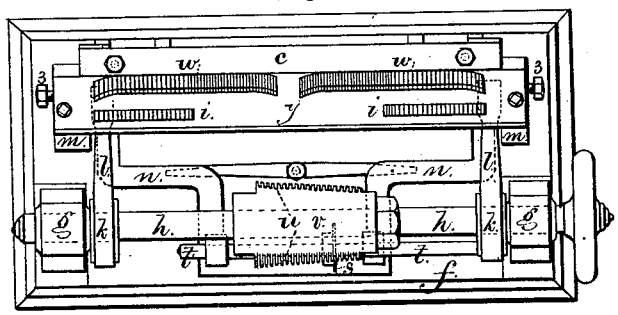

In the drawing, Figure 1 is a plan of the machine. Fig. 2 is an elevation of the same, and Fig. 3 is a cross-section.

Figure 4:
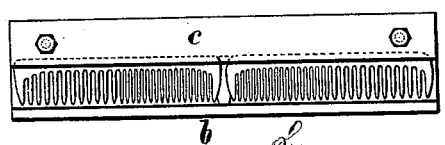

The comb-blank $a$ is laid upon the bed or rest $b$ and held by the clamp $c$ that grasps the head thereof. We prefer and use two sets of cutters, and two comb-blanks are cut into comb-teeth at once, as hereafter detailed. The two combs and rests are shown in Fig. 4. The rest $b$ is upon suitable supports $d$ from a bed, $f$, which bed also carries the standards $g$ supporting the driving-shaft $h$ that is revolved by competent power. The eccentrics $k$ on the shaft $h$ and their rods $l$ communicate to the cutter-frame $m$ a vibratory motion, such frame $m$ being hung on centers at the lower ends that unite the cutter-frame $m$ to the presser-frame $n$ that is jointed at the ends $o$ to the standards $d$, and the other part of said frame $n$ is raised by the spring $r$ so that the disk $s$ on the sliding shaft or rod $t$ is pressed toward the shaft $h$ and into contact with the conical screw-section $u$ or the cylindrical base $v$ of said screw-section. The cutters $w$ are held in the head $y$ by clamping-screws 3, and the cutters are preferably made of plates of a thickness corresponding with the distance from the center of one tooth to the center of the next, and the end of each cutter is made as an engraving-tool of the shape of the opening between one tooth and the next, so that by a series of cuts the depth of the channel or furrow will be increased until the comb-blank is half cut through, and then the blank is reversed and the other side cut in the same manner.

Figures 5, 6:
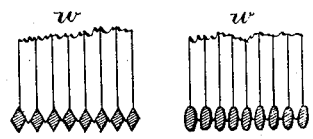

Figs. 5 and 6 illustrate different shapes of teeth sectionally and cutters for the same.

In operating this machine the eccentrics $k$ $k$ move the frame and cutters back and forth and the conical screw-section $u$ when it comes in contact with the disk $s$, or its equivalent, presses that and the frame $n$ down and forces the cutters into the comb-blank; but after the conical screw-section turns past the disk the frame $n$ is raised by the spring $r$ and the cutters go back to the base of the teeth. At the next forward movement the cutters are pressed more deeply into the blank, because the screw-section by its inclined threads has moved the disks $s$ and its shaft along endwise, and the conical screw-section the next time it comes into contact with such disk moves the frame $n$ down a greater distance, and so on, the cutters are pressed down progressively as they reciprocate, until they have cut half through the comb-blank; and the centers $o$ on which the cutters $w$ swing being below or behind the comb-blanks, the engravers or cutters move in the arc of a circle and the teeth, hence, are tapering and convex.

According to the shape of the conical screw-section and its position in relation to the eccentrics, so the engraving-tools will cut the base of the slot between the teeth more or less abruptly.

When all the teeth of the comb are uniform the blank may be reversed and held the other side up in the same place while the second side is being engraved; but where the head or quill of the comb is curved, or the teeth are coarse and fine, it is advantageous to engrave two combs at once, the cutters being reversed in arrangement so that opposite sides of the comb-blanks are being engraved at the same time; hence, to complete both combs they are simply transposed in position and turned the other side up, and the unfinished side of each completed.

The head $y$ may have a second slot, as shown at *i*, into which cutters can be inserted that serve to more perfectly finish the points of the teeth.

Where the teeth of a comb or the two outside surfaces are required to be straight instead of convex, or straight a portion of their lengths from their bases and convex the other portion, or of any other required shapes, the head containing the cutting-tools must be moved by mechanism, which will cause it to move back and forth either in straight lines or in lines suited to the required shape of the teeth.

This mechanism is cheap, simple, durable, and effective in producing completely finished comb-teeth.

We claim as our invention—

1. In a comb-cutting machine, a series of engraving-tools contained within a head, in combination with a rest for the comb and mechanism for giving motion to the tools and head, substantially as set forth.

2. The combination of the engraving tools or cutters $w$, head $y$, frames $m$ $n$, screw sectional cone $u$, and eccentrics $k$, connecting the vibrating frame with the main shaft, substantially as set forth.

3. The arrangement in a comb-cutting machine of two sets of engraving-tools in reverse positions, in combination with a rest for holding two combs in similar positions, substantially as and for the purposes set forth.

4. In a comb-cutting machine a series of engraving-tools in a head that swings upon centers located at the opposite side of the comb to the cutters, substantially as set forth.

Signed by us this 4th day of November, A. D. 1874.

JOHN W. HYATT.
I. SMITH HYATT.

Witnesses:
GEO. T. PINCKNEY,
CHAS. H. SMITH.